United States Patent [19]

Prescott et al.

[11] 4,098,592

[45] Jul. 4, 1978

[54] TEMPERATURE CONTROL SYSTEM FOR CHROMATOGRAPHIC APPARATUS

[75] Inventors: Robert C. Prescott, Foxboro; Roy P. Lindquist, Norton, both of Mass.

[73] Assignee: The Foxboro Company, Foxboro, Mass.

[21] Appl. No.: 744,730

[22] Filed: Nov. 24, 1976

Related U.S. Application Data

[63] Continuation of Ser. No. 550,119, Feb. 14, 1975, abandoned.

[51] Int. Cl.$^2$ ............................................. B01D 15/08
[52] U.S. Cl. ......................................... 55/67; 55/163; 55/197; 55/208; 55/269; 55/468; 210/198 C; 236/18
[58] Field of Search ................... 55/67, 197, 386, 268, 55/267, 269, 468, 163, 217, 208; 210/31 C, 198 C, 175; 165/122, 123; 236/12 A, 18, 19; 432/4, 38, 40

[56] References Cited

U.S. PATENT DOCUMENTS

| | | | |
|---|---|---|---|
| 1,188,893 | 6/1916 | Brickman | 210/175 X |
| 2,992,858 | 7/1961 | Pendleton | 55/468 X |
| 3,165,147 | 1/1965 | Roof et al. | 55/386 X |
| 3,244,152 | 4/1966 | Mixon et al. | 55/67 X |
| 3,422,603 | 1/1969 | Redmond, Jr. | 55/386 |
| 3,710,557 | 1/1973 | Couchman et al. | 55/468 X |

*Primary Examiner*—John Adee
*Attorney, Agent, or Firm*—Parmelee, Johnson, Bollinger & Bramblett

[57] ABSTRACT

A process chromatograph including a column for separating fluid samples into their individual components, and a density-responsive detector connected to the column output to produce a pressure signal representing the concentration of the separated components. The column and associated elements are contained within a thermally-insulated housing the interior spaces of which are heated and maintained at a set-point temperature by a temperature regulating system. Heat energy is supplied by steam to one section of a two-section tubular heat-exchanger. A stream of air is caused to flow through the other section and into the housing interior, to transfer heat thereto. The rate of heat transfer is automatically controlled by a thermostatic control which continuously adjusts the flow of air through the heat exchanger so as to maintain the interior temperature at a desired set-point.

17 Claims, 8 Drawing Figures

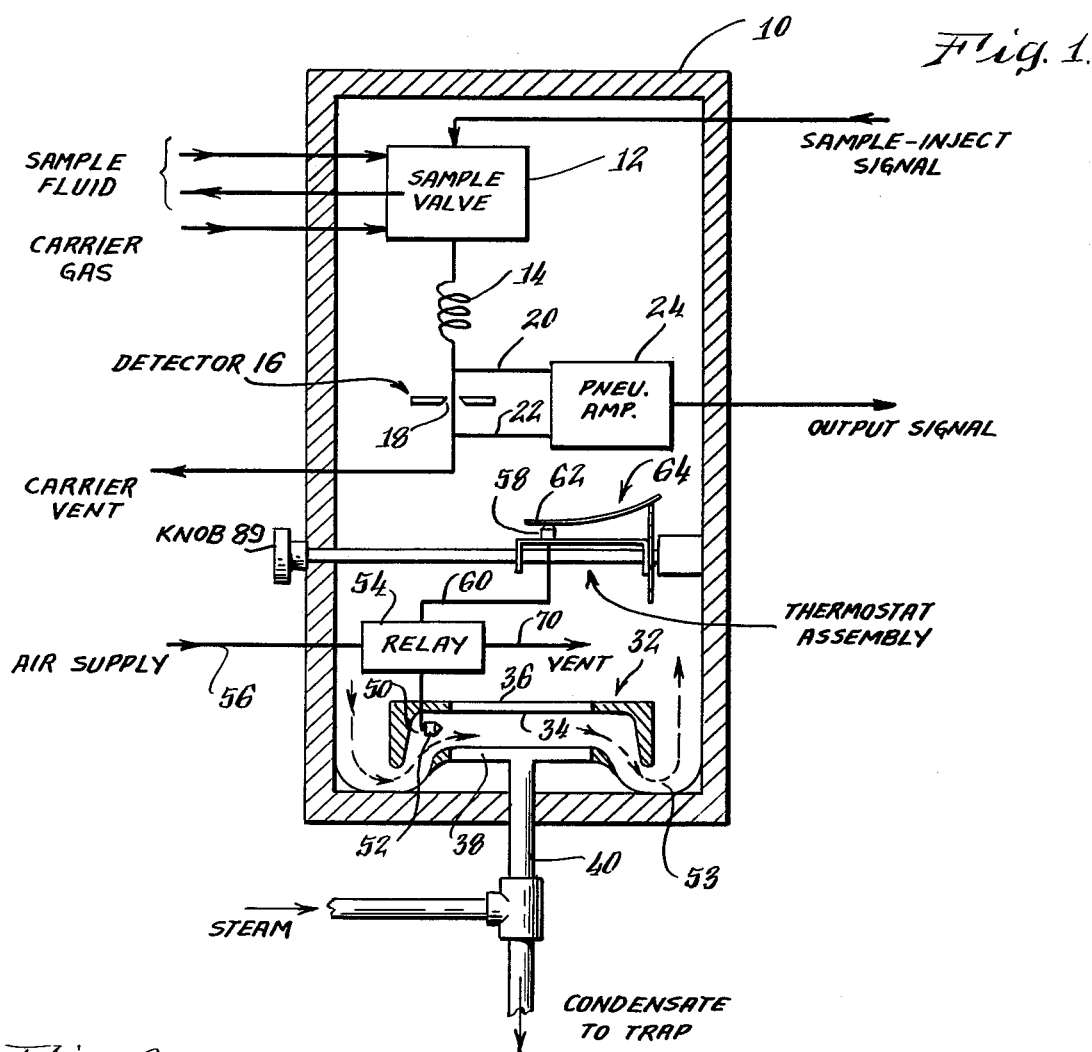
Fig. 1.
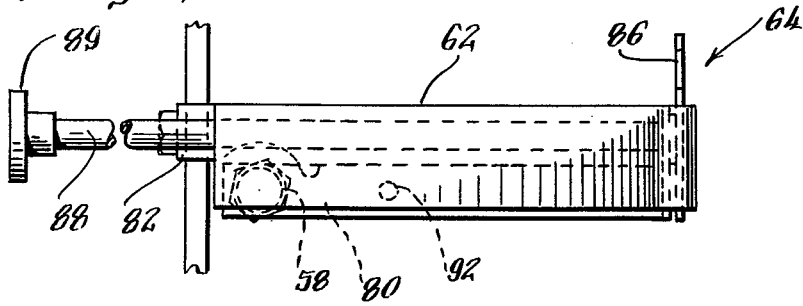
Fig. 2.
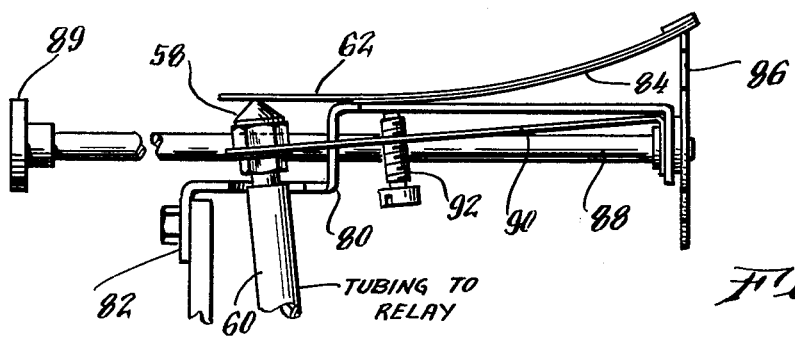
Fig. 3.
Fig. 4.

TEMPERATURE CONTROL SYSTEM FOR CHROMATOGRAPHIC APPARATUS

This is a continuation, of application Ser. No. 550,119 filed Feb. 14, 1975 now abandoned.

BACKGROUND OF THE INVENTION

1. Field of the Invention

This invention relates to means for regulating the temperature of temperature-sensitive instrumentation equipment. The invention is, for example, well adapted for use with chromatographic apparatus, wherein a sample fluid is injected into a column to be separated into its individual components which elute successively from the column to permit measurement of the concentration thereof.

2. Description of the Prior Art

Chromatographic apparatus is known to be quite temperature sensitive, particularly the separation columns commonly used in such apparatus. Thus, when accurate component concentration measurements are desired, such apparatus usually has been provided with temperature-regulating means to hold the equipment temperature within a quite narrow range. Although a variety of different approaches have been proposed for achieving this result, generally the temperature-sensitive chromatographic elements have been placed in a chamber arranged as an oven, with electrical heating means to elevate the temperature above ambient, and with one or more electrically-operated thermostats to control the rate of heat generation so as to regulate the temperature of the chromatographic apparatus.

Such electrical heating and temperature-regulating systems are undesirable for use in process chromatographs, in large part because the introduction of electrical energy in the process area creates potentially serious hazards. Thus, there has been a need for non-electrical heating and temperature-regulating means adapted for use with chromatographic apparatus. Moreover, there is a need for such apparatus which is relatively simple, reliable in operation, and economical to manufacture.

SUMMARY OF THE INVENTION

The present invention concerns a temperature-regulating system for chromatographic apparatus wherein heat is supplied from a benevolent non-electrical heat source, and wherein the rate of heat transfer to that apparatus is regulated by a control arrangement using a non-electrical benevolent source of energy.

In one preferred embodiment of the invention, to be described hereinbelow in detail, the heat is supplied by a source of steam, and the rate of heat transfer to the chromatographic equipment is regulated by a pneumatic control system.

BRIEF DESCRIPTION OF THE DRAWINGS

FIG. 1 is a schematic showing of a temperature-regulating system in accordance with the present invention;

FIG. 2 is a plan view of a thermostatic assembly for controlling the flow of air in the system of FIG. 1;

FIG. 3 is an elevation view of the assembly of FIG. 2;

FIG. 4 is an elevation view showing the adjustment cam for the assembly of FIG. 2;

DETAILED DESCRIPTION OF A PREFERRED EMBODIMENT

Figure 5:
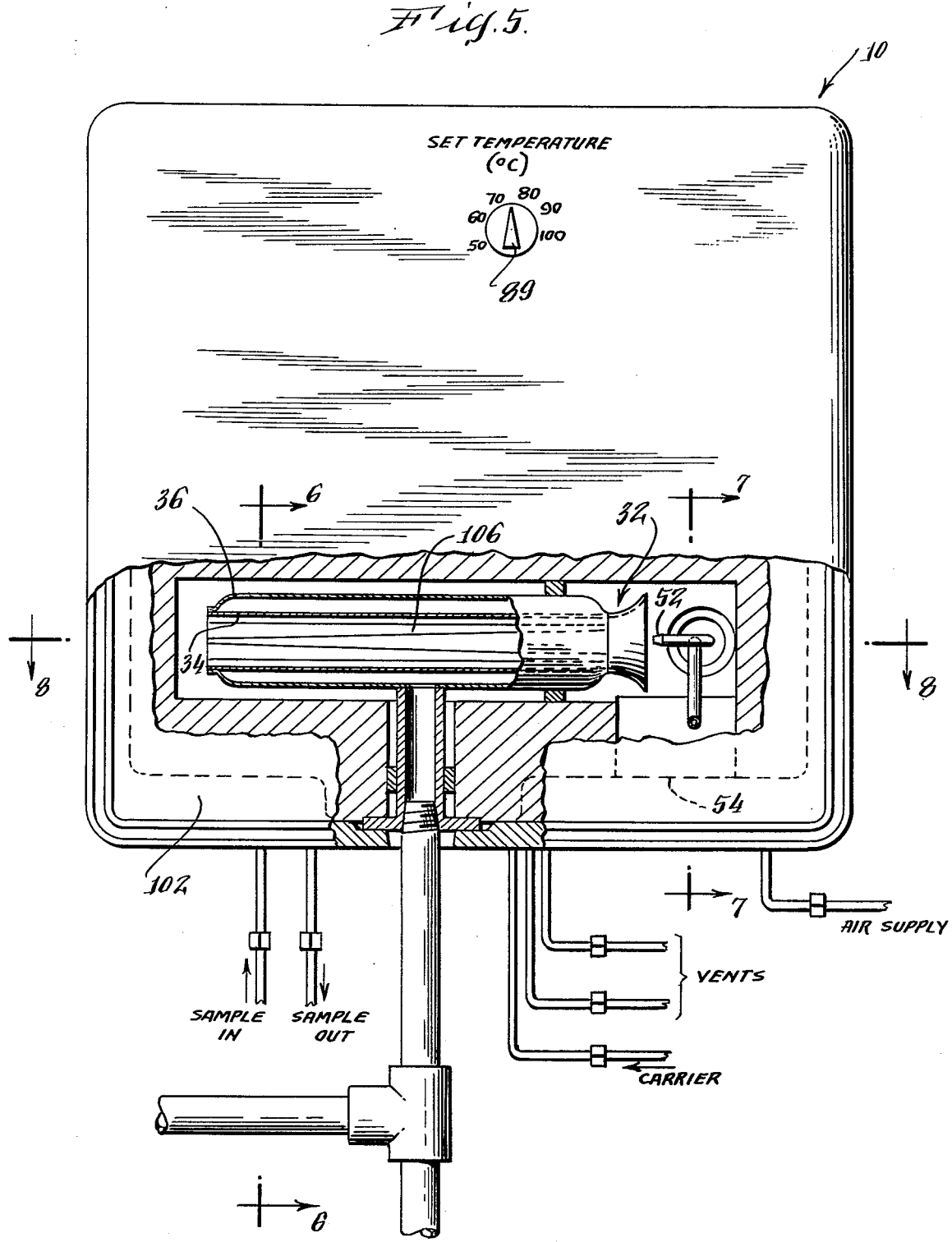
FIG. 5 is an elevation view, partly in section to show the interior of a field-mountable housing with a heat system in accordance with the invention.
Figure 6:
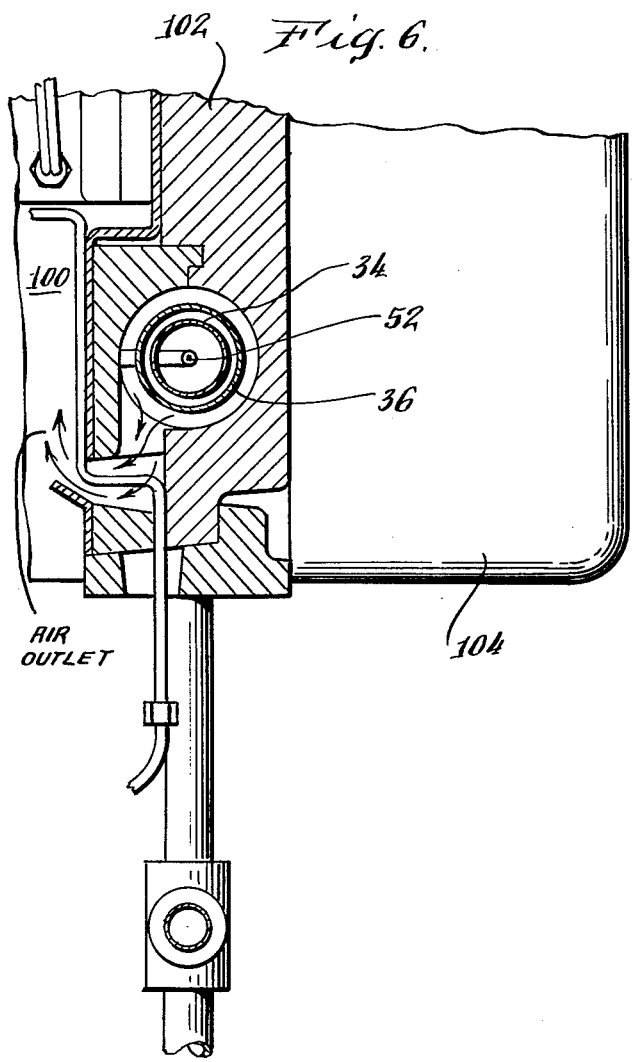
FIG. 6 is a vertical section taken along line 6—6 of FIG. 5.
Figure 7:
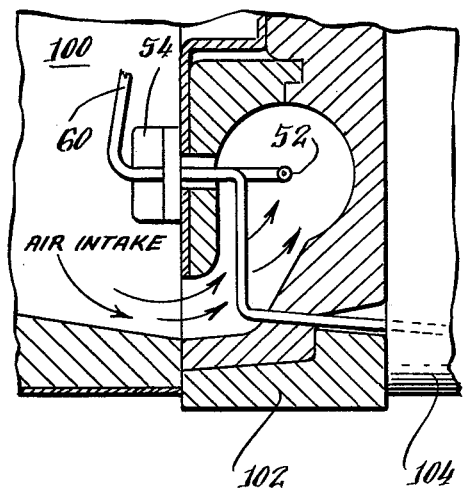
FIG. 7 is a vertical section taken along line 7—7 of FIG. 5.

Referring now to FIG. 1, there is shown in schematic format a chromatograph comprising an insulated housing 10 providing an interior chamber within which is mounted certain temperature-sensitive chromatographic elements. The operating elements of the chromatograph comprise a sample valve 12. This valve receives a continuous flow of both sample fluid and carrier gas and, when actuated in response to a signal, inserts a small predetermined quantity of sample into the flowing stream of carrier gas which carries the sample into and through a column 14. This column is of conventional construction and serves to separate the sample fluid into its individual components which elute successively from the column and pass through a detector 16 to vent.

The detector 16 includes a flow-restricting orifice 18 in the path of fluid flow. This orifice is adapted to produce on lines 20, 22 a pressure signal reflecting the concentrations of the eluting components. This measurement signal is intensified by a pneumatic amplifier generally indicated at 24.

In accordance with the present invention, the interior of the housing 10 is heated by a temperature-regulated heating system illustrated in schematic form in the lower portion of the housing. This heating system includes a stainless-steel heat-exchanger 32 consisting of an inner tube 34 and an outer tube 36 serving to form a sealed jacket 38 to receive steam from a vertical steam supply pipe 40. The steam condensate returns down along the pipe walls to a condensate trap (not shown).

The left-hand end of the heat-exchanger 32 is formed to provide an intake port 50. Within the port is mounted an air-jet nozzle 52 serving as an air ejector. Air from this nozzle is directed to flow through the tube 34, and thereby draw into the intake port a substantially greater amount of air from the interior of the housing 10 for passage through the heat-exchanger. This air is returned to the housing interior through the outlet port 53. As the air passes through the tube 34, it is heated by contact with steam-heated portions of the tube. Preferably, longitudinal heat-exchanger fins (not shown in FIG. 1) are secured to the inner wall of the tube 34 in order to enhance the rate of heat transfer from the steam to the air passing through the heat-exchanger.

The rate of air flow from the housing interior and through the heat-exchanger 32 is proportional to the rate of air flow from the jet 52. In a preferred embodiment, the jet nozzle was 0.02 inches in diameter, capable of producing a flow of 0.2 scfm with a 20 psi supply. This jet flow forces about 8 scfm to circulate through the heat exchanger.

The air flow from jet 52 is automatically controlled so as to regulate the heat transfer into the interior of the housing 10 and thereby to tend to maintain the interior chamber temperature constant at a desired set-point. For this purpose, the jet is supplied with air from a conventional air-control relays 54, e.g., as shown in U.S. Pat. No. 3,566,899 (Bowditch), and connected to the usual source of air 56, for example at 20 psi. The rate of air flow from the relay to the jet 52 is variable in response to changes in the back-pressure of a nozzle 58 connected to the relay by a line 60.

The mouth of the nozzle 58 is positioned adjacent a bimetal element 62 which forms part of a thermostat assembly 64 described hereinbelow in detail. This bimetal element serves as a nozzle "flapper", to set the rate of air flow out of the nozzle 58 in correspondence to the temperature of the bimetal, and thereby correspondingly to control the nozzle back-pressure and, in turn, control the output of relay 54. The manner in which the nozzle back-pressure controls the air output of the relay 54 is well-known, and is described in detail in the above-mentioned U.S. Pat. No. 3,566,899.

If the temperature of the spaces around the bimetal element 62 increases, the element will curl slightly away from the mouth of the nozzle 58, thus increasing the rate of nozzle air flow and correspondingly decreasing the nozzle back-pressure. The air output from the relay 54 will similarly decrease, thereby reducing the rate of heat flow into the interior of the housing 10. This tends to reduce the temperature of those interior spaces, thus tending to maintain the temperature at a desired set point.

The described system in advantageous in making use of heat energy in the form of steam, since steam is non-hazardous and is commonly available, e.g., where a process chromatograph apparatus would be used. It may be noted that with the heat-exchanger arrangement described above, the housing temperature is regulated by controlling the rate of air flow through the heat-exchanger tube 34, rather than by controlling the temperature or flow of the steam. This is an advantageous feature because the control of steam is somewhat difficult task, especially at relatively low flow rates, whereas altering the rate of air flow through a tube is comparatively simpler. Thus, the disclosed system is uniquely useful in applications requiring quite low heat-transfer rates, e.g., in chromatographic equipment where only about 60 watts is required, or for heating other types of instrumentation. The control system disclosed is relatively simple, yet provides the benefits of a continuously operating, proportional type of control. Such a control system is superior to those proposed systems which attempt to achieve simplicity by utilizing on-off controls.

Apparatus in accordance with the present invention has been created particularly for use with a chromatographic system of the type disclosed in a copending application filed by Annino et al., wherein the separated sample component concentrations are measured by a detector including flow-restrictor means, preferably an orifice, arranged in the stream of fluid eluting from the column for the purpose of producing a density-responsive pressure signal which indicates the component concentration. It has turned out that the overall combination of such a chromatograph, together with the disclosed temperature-regulating means, is particularly advantageous because a restrictor-type detector (e.g., an orifice) has a temperature-response characteristic which tends to compensate for the temperature-sensitivity of the column. Thus such a chromatograph permits relatively accurate measurements even though the column temperature is regulated only to within ± 1° F. Such a regulation range can be met by the relatively non-complex, non-electrical temperature-control equipment described hereinabove, with the proportional band set at no more than 1° F.

Another feature of the disclosed embodiment is that the heat-exchanger tube 34 is connected to the interior of housing 10 by channels which extend downwardly away from the tube. Thus, heated air within the tube cannot reach the interior chamber by a rising convection current. That is, heated air can be "stalled" within the heat exchanger, if the out-flow from air-jet 52 is reduced to a sufficiently low level. This is important because it permits extremely low heat inputs, even though the steam temperature is quite high, and thereby effectively extends downwardly the range of temperatures to which the control system can be set. For example, a control system in accordance with this invention has been designed to hold the temperature at any set-point within the range of from 140° to above 200° F.

The operating temperature range also is extended downwardly by directing the vent air from the relay 54 into the housing interior, as indicated at 70. When the chamber interior temperature increases, the air flow from jet 52 decreases, so as to tend to reduce the rate of heat transfer. At the same time, the air flow from the relay vent 70 increases, and this aids in cooling the interior of the compartment. The air introduced by the relay into the housing interior ultimately finds its way back out, since the housing 10 is not of air-tight construction. The temperature-control apparatus may, if desired, include other sources of air jets in the interior of the housing 10, for the purpose of stirring the interior air to provide for effective mixing, and thus uniform temperature. Also, although the thermostat assembly 64 is shown positioned just above the heat-exchanger 32, for illustrative purposes, it may be preferred to mount the thermostat assembly in a more remote position within the housing, e.g., at the top end thereof.

Referring now to FIGS. 2-4, a preferred thermostat assembly 64 comprises a mounting bracket 80 adapted to be secured at its left-hand end 82 to a structural member of the housing 10. An elongate spring plate 84 is fastened at its left end to the top of bracket 80, and the bimetal element 62 is in turn fastened to the spring. The right-hand end of the spring plate 84 is deflected a substantial distance upwards in cantilever fashion by a cam 86 secured to a rotatable shaft 88 adapted to carry an adjustment knob 89 at its other end. Secured to the right-hand end of the bracket 80 is an elongate resilient support arm 90 carrying the nozzle 58 at its other end, and deflected down by a screw 92 so as to hold the mouth of the nozzle closely adjacent the bimetal element 62.

The left-hand end of the bimetal element 62 is maintained effectively parallel to the plane of the nozzle mouth, to provide for proper flapper operation throughout the range of bimetal movement. The length of the bimetal element is predeterminedly longer than the spring plate 84, preferably about 4/3 times as long. With the spring plate supported for cantilever bending at its left end, the effective hinge points of both the spring plate and the bimetal will be approximately coincident. As the cam 86 is rotated, so as to alter the deflection of the unsupported end of the spring plate, the left-hand extension of the bimetal 62 will remain closely adjacent the mouth of the nozzle, generally parallel to the plane thereof, while the spacing between the flapper and the nozzle will change so as to alter the temperature set-point of the control system.

Figure 8:
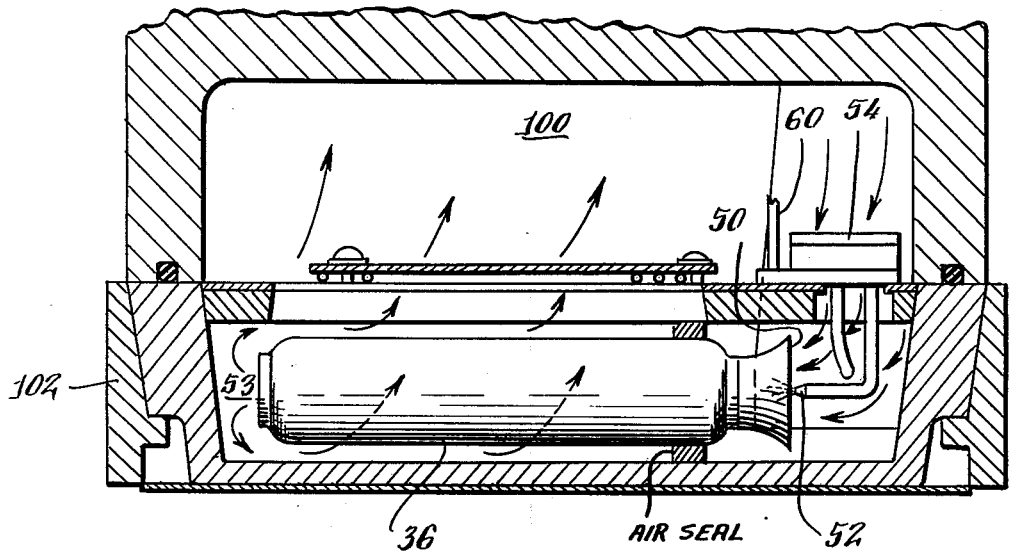
FIG. 8 is a horizontal section taken along line 8—8 of FIG. 5.

FIGS. 5 through 8 have been included to show how the invention can be developed in an actual commercial configuration. In these figures, the same reference numerals have been used as in the preceding FIGS. 1–4 for identifying functionally corresponding elements. As seen in FIG. 8, the housing 10 is arranged to provide a thermally insulated compartment or chamber 100 for containing the temperature-sensitive chromatographic elements, and an adjacent section 102 providing structural support and carrying the heat-exchanger 32. The housing may also include another section 104 (not shown in FIG. 8) to provide a second compartment for the various pneumatic control devices, including logic units and the like, used to automatically program the chromatographic functions and process the resulting measurement signals. FIG. 5 is a view from the latter compartment 104 looking at the wall of the section 102. This wall can include manually operable controls for the various pneumatic operating devices, for example, the adjustment knob 89 for the thermostat assembly 64, to set the set-point of the temperature control system. FIG. 5 also shows that the interior of the heat-exchanger tube 34 is provided with elongate, tapered fins 106, to aid in the heat-transfer function.

Although a preferred embodiment of the present invention has been described hereinabove in detail, this is not to be considered as necessarily limiting of the invention, it being understood that numerous changes can be made within the scope of the invention to suit the technical requirements of particular applications.

We claim:

1. For regulating the temperature of temperature sensitive instrumentation equipment to maintain it at a realatively constant temperature, apparatus comprising:
    a housing providing a compartment for containing temperature-sensitive equipment;
    a heat-exchanger adjacent said housing and having two separate sections between which heat can be transferred;
    first supply means to supply a first fluid at elevated temperature to one of said sections;
    second supply means to supply a pressurized second fluid;
    flow means responsive to said pressurized second fluid to develop a flow of a third fluid, in gaseous form, within the other of said heat exchanger sections for circulation within said compartment, said third fluid being heated in said other section by heat transferred from said first fluid; and
    regulating means responsive to temperature within said compartment for controlling the flow rate of said third fluid so as to regulate the rate of transfer of heat into said compartment to maintain said temperature relatively constant.

2. Apparatus as claimed in claim 1, wherein said supply means comprises means to supply a heated gaseous fluid to said first section.

3. Apparatus as claimed in claim 2, wherein said supply means is adapted to provide steam to said first section.

4. Apparatus as claimed in claim 1, wherein said flow means comprises ejector means to produce a flow of gas through said other section.

5. Apparatus as claimed in claim 4, wherein said other heat-exchanger section comprises wall means defining an elongate passage communicating at both ends with the interior of said housing;
    said ejector means comprising an air-jet positioned at an air intake end of said passage to direct a flow of air through said passage and thereby to draw air from said housing interior into said passage to be heated therein and forced back into said housing interior.

6. Apparatus as claimed in claim 5, wherein said regulating means comprises means to vary the flow of air from said air jet so as to alter correspondingly the rate at which air is drawn into said intake from said housing interior.

7. Apparatus as claimed in claim 6, wherein said regulating means comprises a pneumatic relay supplying air to said air-jet;
    a control nozzle coupled to said relay to control the air flow from said relay to said air jet; and
    thermostatic means in said housing and associated with said control nozzle to alter the nozzle back-pressure in accordance with changes in temperature within said housing.

8. Apparatus as claimed in claim 7, wherein said thermostatic means comprises a bimetal arranged as a flapper over the mouth of said nozzle.

9. Apparatus as claimed in claim 8, wherein said bimetal is secured to a cantilever-supported spring plate for flexing movement therewith;
    said bimetal having a portion extending beyond the supported end of said spring plate to a region adjacent the mouth of said control nozzle; and
    adjustable cam means engaging the non-supported end of said spring plate to bend it and the bimetal in a curved arc so as to provide for adjustment of the temperature set-point with changes in the amount of bending effected by said cam means.

10. Apparatus as claimed in claim 1, wherein said other heat-exchanger section comprises means defining a chamber to which heat can be transferred from said first section; and
    means connecting said other section to the interior of said housing and comprising conduit means extending in a downward direction from said chamber, whereby heated fluid in said chamber cannot flow into said housing interior through a rising flow path.

11. Apparatus as claimed in claim 10, wherein said heat-exchanger comprises a double-walled member providing an outer jacket for introduction of said heated fluid;
    the inner part of said double-walled member providing said chamber.

12. Apparatus as claimed in claim 11, wherein said double-walled member is tubular in configuration, with the inner part defining a passageway;
    said conduit means comprising first and second conduits connecting the respective ends of said passageway to the housing interior.

13. Apparatus as claimed in claim 12, wherein the outer jacket of said tubular member is connected to a downwardly-extending pipe adapted to be connected to a source of steam.

14. In the art of heating instrumentation equipment for industrial processes by heat from a supply of heated fluid, the improved method of regulating the temperature of the spaces containing the equipment comprising the steps of:
    supplying heated fluid to one section of a two-section heat exchanger;
    transferring heat from said fluid in said one section to the other section;
    flowing a gas through said other section at low velocity;

heating said gas while in said other section by heat transferred from said one section;

directing said flow of gas from said one section to the spaces containing said instrumentation equipment; and controllably adjusting the flow rate of said gas so as to regulate the rate of transfer of heat into said spaces to maintain the temperature of said spaces at a desired temperature.

15. The method of claim 14, wherein said gas is caused to flow through said other section by being directed into that section by an ejector which serves to draw air from said spaces to travel with the gas as it passes through said other section and back into said spaces from an outlet end of said other section.

16. Apparatus for heating instrumentation equipment for industrial processes by heat from a supply of heated fluid such as steam comprising:
a housing for containing instrumentation equipment;
a two-section heat exchanger adjacent said housing;
first means for supplying said heated fluid to one section of said heat exchanger;
said other section being in communication with the interior of said housing;
second means for supplying a pressurized second fluid;
flow means activated by said second fluid for circulating a third fluid, in gaseous form, through said other section and into said housing interior, said other section being in heat transfer relationship to said one section, thereby heating said third fluid; and
control means responsive to temperature within said housing for altering the flow rate of said third fluid through said other heat exchanger section to regulate the rate of transfer of heat from said other heat exchanger section into said housing so as to maintain the temperature of said instrumentation equipment relatively constant.

17. Apparatus for heating chromatographic equipment and maintaining it at a relatively constant temperature comprising:
a housing for containing chromatographic equipment;
a heat exchanger adjacent said housing having first and second sections in heat exchange relationship, said second section comprising means defining a chamber through which air can flow and having inlet and outlet openings communicating with the interior of said housing;
means for supplying steam to said first section of said heat exchanger to transfer heat to said second section to raise the temperature of air passing through said chamber;
an ejector located in an air flow region of said chamber to develop a circulation flow of air serially through said chamber and the interior of said housing, said air being heated in said chamber by heat transferred from said steam;
a pneumatic relay supplying air to said ejector;
a control nozzle coupled to said relay to control the air flow to said ejector; and
a thermostat assembly in said housing having a part thereof positioned over the mouth of said nozzle and movable in response to changes in temperature so as to alter the nozzle back-pressure in accordance with temperature changes in said housing thereby regulating the flow of air through said chamber to maintain the temperature of said housing relatively constant.

* * * * *